US012544284B2

(12) United States Patent
Marsh

(10) Patent No.: US 12,544,284 B2
(45) Date of Patent: Feb. 10, 2026

(54) BED LIFTING MECHANISM

(71) Applicant: ACCORA LIMITED, Cambridge (GB)

(72) Inventor: Frederick Jabez Marsh, Cambridge (GB)

(73) Assignee: ACCORA LIMITED, Cambridge (GB)

(*) Notice: Subject to any disclaimer, the term of this patent is extended or adjusted under 35 U.S.C. 154(b) by 148 days.

(21) Appl. No.: 18/697,286

(22) PCT Filed: Sep. 29, 2022

(86) PCT No.: PCT/GB2022/052467

§ 371 (c)(1),
(2) Date: Mar. 29, 2024

(87) PCT Pub. No.: WO2023/052770

PCT Pub. Date: Apr. 6, 2023

(65) Prior Publication Data

US 2025/0041135 A1 Feb. 6, 2025

(30) Foreign Application Priority Data

Sep. 30, 2021 (GB) .................................... 2114016

(51) Int. Cl.
*A61G 7/015* (2006.01)
*A61G 7/012* (2006.01)
*A61G 7/018* (2006.01)

(52) U.S. Cl.
CPC ............. *A61G 7/012* (2013.01); *A61G 7/018* (2013.01)

(58) Field of Classification Search
CPC ........ A61G 7/012; A61G 7/018; A61G 7/015; A61G 7/1019; A61G 1/0562
USPC ................................................................ 5/11
See application file for complete search history.

(56) References Cited

U.S. PATENT DOCUMENTS 3,891,108 A 6/1975 Traficant
7,013,510 B1 3/2006 Johnson
7,134,155 B2 * 11/2006 Freeborn ................ A61G 7/012 16/35 R
2006/0037518 A1 2/2006 Lopez Alba
2013/0256611 A1 10/2013 Ruth

* cited by examiner

*Primary Examiner* — David R Hare
*Assistant Examiner* — Joseane E. Tejada
(74) *Attorney, Agent, or Firm* — Hayes Soloway P.C.

(57) ABSTRACT

A lifting mechanism for a bed includes an elongate first leg having a first leg axis; an elongate second leg having a second leg axis and being pivotally connected to the first leg; a carriage assembly slidably connected to the first leg so as to be moveable in a direction substantially parallel to the first leg axis; a guide rail connected to the second leg and having a guide rail axis, the guide rail axis being at a non-zero angle to the second leg axis; and a moveable actuator configured to apply a force to the carriage assembly.

20 Claims, 10 Drawing Sheets

BED LIFTING MECHANISM

CROSS-REFERENCE TO RELATED APPLICATIONS AND PRIORITY

This patent application claims priority from PCT Application No. PCT/GB2022/052467 filed Sep. 29, 2022, which claims priority from United Kingdom Patent Application No. 2114016.5 filed Sep. 30, 2021. Each of these patent applications are herein incorporated by reference in their entirety.

FIELD OF THE INVENTION

The present invention relates to the field of lifting mechanisms for beds, and beds incorporating such lifting mechanisms. The lifting mechanisms are particularly suited for use in beds in the healthcare industry. The lifting mechanisms allow a bed to be lowered close to the floor to reduce injuries from falls and to be raised to a suitable height to enable easy access to a person lying on the bed.

BACKGROUND TO THE INVENTION

It is known to provide lifting mechanisms in beds in hospitals and other healthcare facilities. The lifting mechanisms are used to raise and lower the height of the bed, i.e. increase or decrease a distance between the mattress and the floor.

This has the advantage of allowing the bed to be raised to a height at which a healthcare worker, such as a doctor or nurse, has easy access to the patient without bending. In some situations the lifting mechanisms may also allow the bed to be lowered such that the mattress is close to the floor on which the bed is standing. This has the advantage that, if a patient rolls out of the bed, they will not fall a large distance to the floor. There is, therefore, a lower risk of injury to the patient than if the bed was at a greater height.

A number of prior art lifting systems are known; however, these known systems have a number of disadvantages. Some of these systems can be expensive to manufacture due to the large number of components and the complexity of the lifting mechanism. Other systems are bulky, taking up a lot of space at the end of the bed. These bulky systems not only significantly increase the size and weight of the bed, but also restrict access to the patient. If the lifting mechanism is located in a headboard or footboard of the bed, then this prevents the headboard or footboard being removed from the bed when, for example, emergency access is needed to the patient for cardiopulmonary resuscitation (CPR). When the lifting mechanism is located under the frame of the bed, this restricts how low the bed can go, i.e. how close the mattress can be positioned relative to the floor.

Furthermore, if a bed is designed to be lowered close to the floor, then the forces that must be applied to the bed lifting mechanism are relatively large, due to the angles between legs of the bed and a mattress support when the bed is fully lowered. This either requires the use of a large actuator, which is necessarily bulky and heavy, or the design of a complex mechanism, which again may restrict how far the bed can be lowered.

Against this background it is an aim of the present invention to provide an improved bed lifting mechanism that overcomes at least some of the disadvantages of prior art systems, whether referred to herein or otherwise.

SUMMARY OF THE INVENTION

A first aspect of the invention provides a lifting mechanism for a bed comprising:

an elongate first leg having a first leg axis;

an elongate second leg having a second leg axis and being pivotally connected to the first leg;

a carriage assembly slidably connected to the first leg so as to be moveable in a direction substantially parallel to the first leg axis;

a guide rail connected to the second leg and having a guide rail axis, the guide rail axis being at a non-zero angle to the second leg axis; and a moveable actuator configured to apply a force to the carriage assembly, wherein, during a first range of movement of the actuator the carriage assembly moves relative to the first leg and the carriage assembly is engaged with the guide rail to apply a force to the guide rail, and during a second range of movement of the actuator the carriage assembly is disengaged from the guide rail and engages with the first leg, and wherein movement of the actuator causes movement of the first leg relative to the second leg about the pivotal connection.

Preferably the first leg includes a stop element. Engagement of the carriage assembly with the first leg preferably comprises contact between the carriage assembly and the stop element. Contact between the carriage assembly and the stop element preferably limits movement of the carriage assembly relative to the first leg along the first leg axis.

The stop element preferably comprises a protrusion. Preferably a part of the carriage assembly abuts the protrusion at the end of the first range of movement of the actuator and the carriage assembly remains in contact with the protrusion during the second range of movement of the actuator.

During the first range of movement of the actuator a part of the carriage assembly engaged with the guide rail may move from a first end of the guide rail to a second end of the guide rail. In preferred embodiments the carriage assembly includes a bearing member slidingly engaged with the first leg and a slider protruding from the bearing member. The slider is preferably arranged to slidingly engage with the guide rail during the first range of movement of the actuator.

In preferred embodiments an angle between the guide rail axis and the second leg axis is between 20° and 45°.

The actuator is preferably a linear actuator. An end of the linear actuator is preferably connected to the carriage assembly.

In preferred embodiments the pivotal connection between the first leg and second leg is midway along the length of each of the first leg and the second leg.

In some embodiments the lifting mechanism comprises a pair of first legs and a pair of second legs, each of the first legs being pivotally connected to a respective one of the second legs. Preferably the carriage assembly comprises a bearing member slidingly engaged with each of the first legs and a cross member extending between and connecting the bearing members. The lifting mechanism may comprise a pair of guide rails, each guide rail being connected to a respective one of the second legs. A slider preferably protrudes from each of the bearing members and each of the sliders is preferably arranged to slidingly engage with a respective one of the guide rails during the first range of movement of the actuator. The actuator is preferably connected to the cross member.

In preferred embodiments the carriage assembly, guide rail and actuator are all on the same side as a plane passing through the pivotal connection between the first leg and the second leg, the plane being parallel to an axis of the pivotal connection.

A second aspect of the invention provides a bed comprising:

a support frame for supporting a mattress; and a lifting mechanism comprising:

an elongate first leg having a first leg axis, an end of the first leg being pivotally connected to the support frame;

an elongate second leg having a second leg axis and being pivotally connected to the first leg, and an end of the second leg being pivotally connected to the support frame;

a carriage assembly slidably connected to the first leg so as to be moveable in a direction substantially parallel to the first leg axis;

a guide rail connected to the second leg and having a guide rail axis, the guide rail axis being at a non-zero angle to the second leg axis; and a moveable actuator configured to apply a force to the carriage assembly, wherein, during a first part of said movement of the actuator the carriage assembly moves relative to the first leg and the carriage assembly is engaged with the guide rail to apply a force to the guide rail, and during a second part of said movement of the actuator the carriage assembly is disengaged from the guide rail and engages with the first leg, and wherein said movement of the actuator causes movement of the first leg relative to the second leg about the pivotal connection so as to raise and lower the support frame.

Preferably the end of the second leg is pivotally and slidingly connected to the support frame.

The actuator may comprise a linear actuator. A first end of the actuator is preferably connected to the support frame and a second end of the actuator is preferably connected to the carriage assembly.

In some embodiments the carriage assembly, guide rail and actuator are all on the same side as a plane passing through the pivotal connection between the first leg and the second leg, the plane being parallel to an axis of the pivotal connection and perpendicular to a plane of the support frame.

In some embodiments the bed may further comprise a mattress frame supported by the support frame. The mattress frame may comprise an angle adjustable section such as an angle adjustable headrest or an angle adjustable footrest. The mattress frame may include two or more angle adjustable sections.

BRIEF DESCRIPTION OF THE DRAWINGS

The invention will now be further described by way of example only and with reference to the accompanying drawings, in which.

DESCRIPTION OF THE PREFERRED EMBODIMENTS

Figure 1:
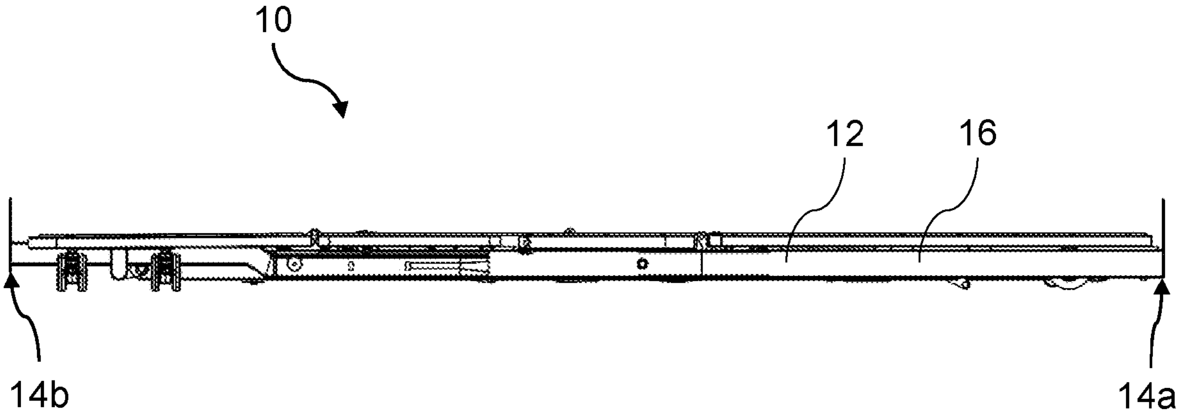
FIG. 1 is a side view of a bed including a lifting mechanism according to the present invention in a fully lowered configuration.
Figure 2:
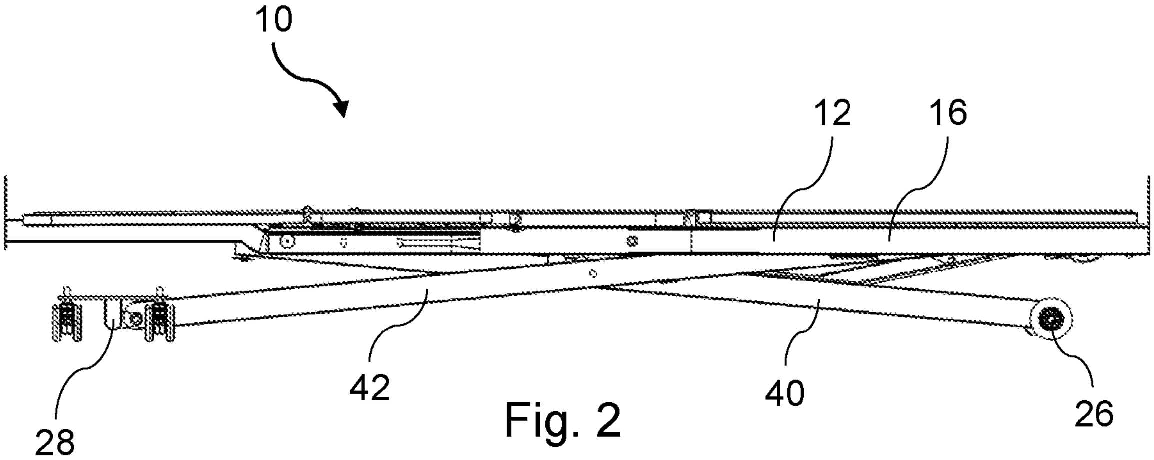
FIG. 2 is a side view of the bed of FIG. 1 including the lifting mechanism according to the present invention in a first partially raised configuration.
Figure 3:
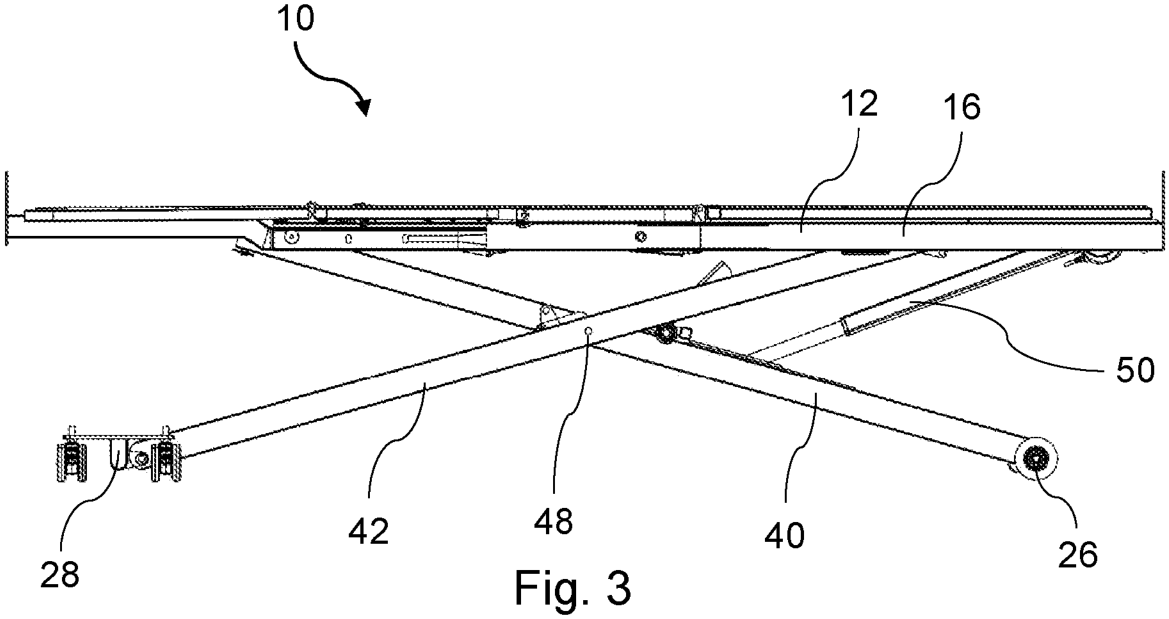
FIG. 3 is a side view of the bed of FIG. 1 including the lifting mechanism according to the present invention in a second partially raised configuration.

A bed 10 according to a preferred embodiment of the present invention is shown in FIGS. 1 to 23.

The bed 10 comprises a support frame 12 for supporting a mattress. The frame 12 extends in a length direction between first and second ends **14*a*, 14*b*. The support frame 12 defines a support plane of the bed 10. The support frame 12** is preferably substantially rectangular.

In this embodiment the support frame 12 comprises two elongate side members 16 and two transverse members 18. A first transverse member **18*a*, which in this embodiment may be considered to be a first end member, extends between a first end 14*a* of each of the side members 16. A second transverse member 18*b* extends across the support frame 12 between the side members 16 at a distance from the second ends 14*b*. In other embodiments the support frame 12 may include any number of transverse members 18**. None, one or two of the transverse members may be considered to be end members.

A mattress (not shown) may be supported directly on the support frame 12, or may be supported on an additional mattress frame 20 that is connected to or supported by the support frame 12. The mattress frame 20 may include a plurality of sections 22 as is known in the art. Each section 22 of the mattress frame 20 may be moveable independently of other sections 22 so as to allow a foot section or head section of the mattress to be raised and lowered for example. In some embodiments the mattress frame 20 may include an angle adjustable headrest and/or an angle adjustable footrest. To permit this movement a suitable actuator 24 may be connected to one or more sections 22 of the mattress frame 20. A headboard (not shown) may be attached to and extend from the support frame 12 at its first end 14*a* and a footboard (not shown) may be attached to and extend from the support frame 12 at its second end 14*b*. One or both of the headboard and footboard may be easily and quickly detachable from the support frame 12.

The bed 10 comprises a first foot assembly 26 disposed proximate the first end 14*a* of the frame 12 and a second foot assembly 28 disposed proximate the second end 14*b* of the frame 12. The first foot assembly 26 comprises a pair of wheels or casters 30 connected by an elongate shaft 32*a*. The second foot assembly 28 comprises an elongate shaft 32*b*. A trolley 34 is disposed at each end of the elongate shaft 32*b*, each trolley 34 comprising a bridging member 36 and two wheels or casters 38. In other embodiments the first foot assembly may be identical to the second foot assembly. The first and second foot assemblies may both comprise a pair of wheels or casters connected by an elongate shaft. The first and second foot assemblies may both comprise trolleys attached to ends of an elongate shaft, each trolley comprising a pair of wheels or casters. In further embodiments the first and second foot assemblies may be of any suitable design.

Each of the foot assemblies 26, 28 is connected to the support frame 12 by a corresponding pair of legs 40, 42. In particular, a pair of first legs 40 connects the first foot assembly 26 to the support frame 12 in a region of the support frame 12 proximate the second end 14*b*, and a pair of second legs 42 connects the second foot assembly 28 to the support frame 12 in a region of the support frame 12 proximate the first end 14*a*.

The legs 40, 42 are configured to allow the support frame 12 to move with respect to the foot assemblies 26, 28 between a fully raised position, illustrated in particular in FIGS. 4, 5 and 20 to 23, and a fully lowered position, illustrated in particular in FIGS. 1 and 6 to 10. FIGS. 2 and 11 to 15 show the bed 10 with the support frame 12 in a first partially raised (or partially lowered) position with respect to the foot assemblies 26, 28, and FIGS. 3 and 16 to 19 show the bed 10 with the support frame 12 in a second partially raised (or partially lowered) position with respect to the foot assemblies 26, 28.

In the fully lowered position the support frame 12 is as close to the floor (on which the foot assemblies 26, 28 are standing) as possible. To achieve this the first and second legs 40, 42 disposed below the support frame 12 preferably extend substantially horizontally so as to minimise the distance between the support frame 12 and the floor. In this position an angle between a longitudinal axis of each of the first legs 40 and the floor is preferably less than 5°, and more preferably less than 3°. Similarly, an angle between a longitudinal axis of each of the second legs 42 and the floor is preferably less than 5°, and more preferably less than 3°.

Each leg 40, 42 is pivotally attached, at a first end, to the respective foot assembly 26, 28 and is pivotally attached, at a second end, to the support frame 12. In this embodiment the first end of each first leg 40 is pivotally attached to the elongate shaft 32*a* connecting the wheels 30 of the first foot assembly 26, and the first end of each second leg 42 is pivotally attached to the elongate shaft 32*b* connecting the trolleys 34 of the second foot assembly 28.

The second end of each of the first legs 40 is pivotally attached to the second transverse member 18*b*. In other embodiments the second end of each of the first legs 40 may be pivotally attached to the side members 16 of the support frame 12 or to any other part of the support frame 12.

Each of the first legs 40 is pivotally attached at a leg pivot 48 to a respective one of the second legs 42. In this embodiment, each of the first legs 40 is pivotally attached to the respective second leg 42 approximately midway along the length of each of the first and second legs 40, 42. As such, an upper portion of each leg 40, 42 is defined between the leg pivot 48 and the second end of the leg 40, 42, and a lower portion of each leg 40, 42 is defined between the leg pivot 48 and the first end of the leg 40, 42.

As the support frame 12 moves from the fully lowered position to the fully raised position, the foot assemblies 26, 28 move in directions towards each other. Similarly, due to the connections between the first legs 40 and the second legs 42, the second ends of the first and second legs 40, 42 also move in directions towards each other. To accommodate this the second end of each of the second legs 42 is slidably engaged with the support frame 12, and well as being pivotally or rotatably mounted to the support frame 12.

Figure 19:
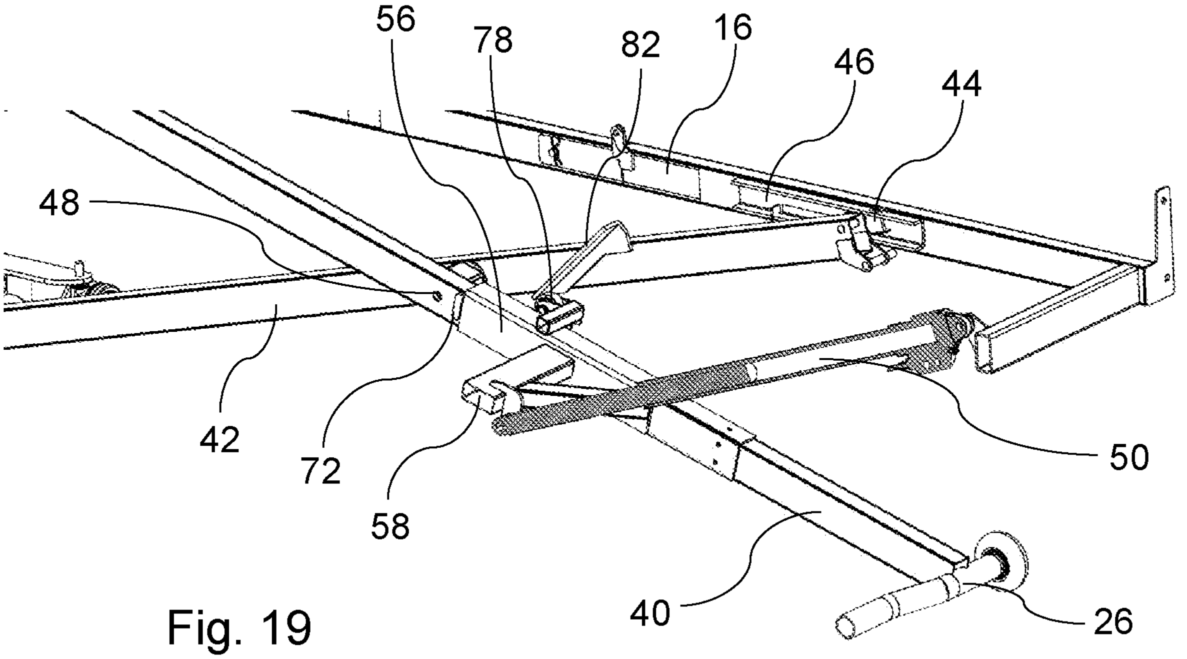
FIG. 19 is a partial sectional view along the line XIX-XIX of FIG. 16.
Figure 20:
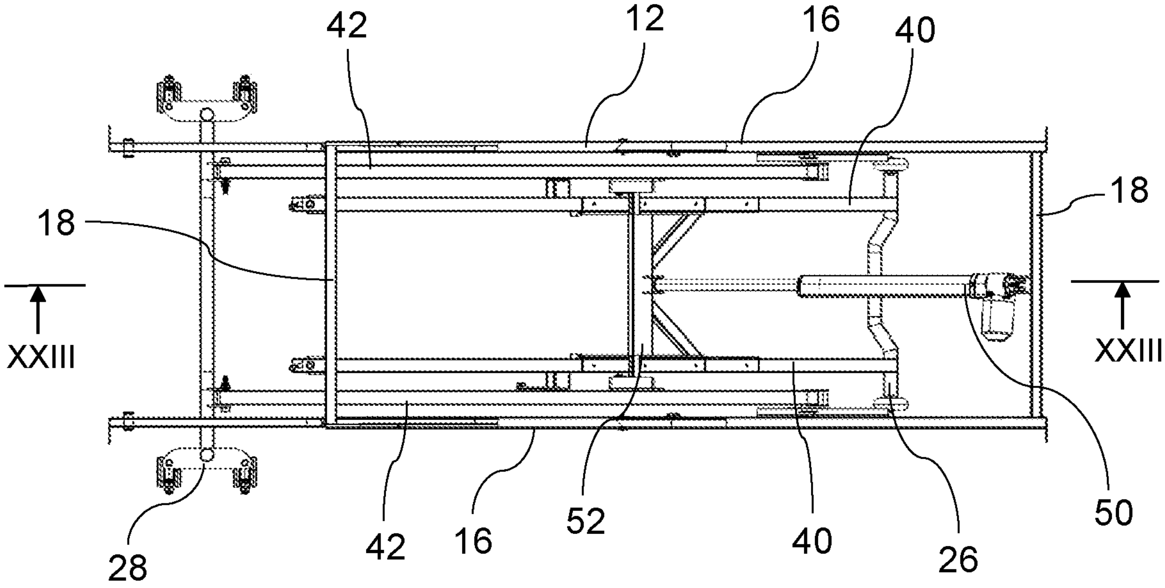
FIG. 20 is a plan view from above of the bed of FIG. 4 in the fully raised position, and with the mattress frame of the bed removed.
Figure 21:
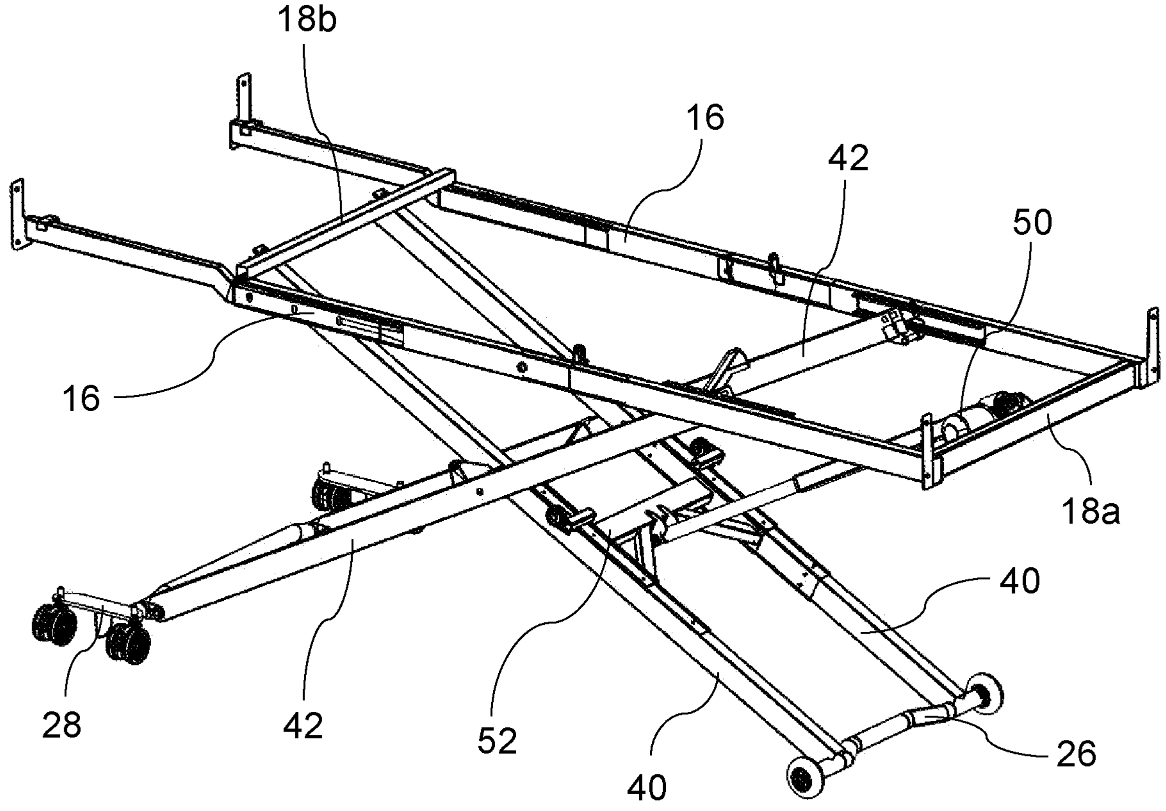
FIG. 21 is a perspective view of the bed of FIG. 20.
Figure 22:
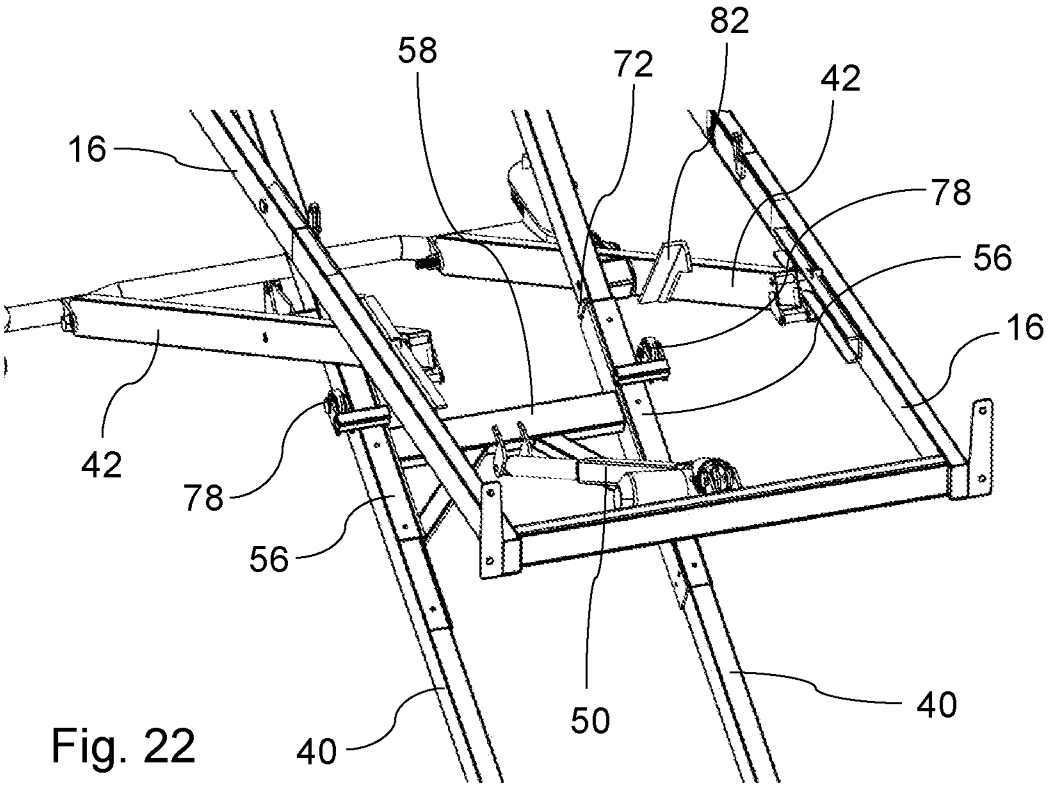
FIG. 22 is a perspective view of a part of the bed of FIG. 21, showing a part of the lifting mechanism of the bed including the actuator and the carriage assembly.
Figure 23:
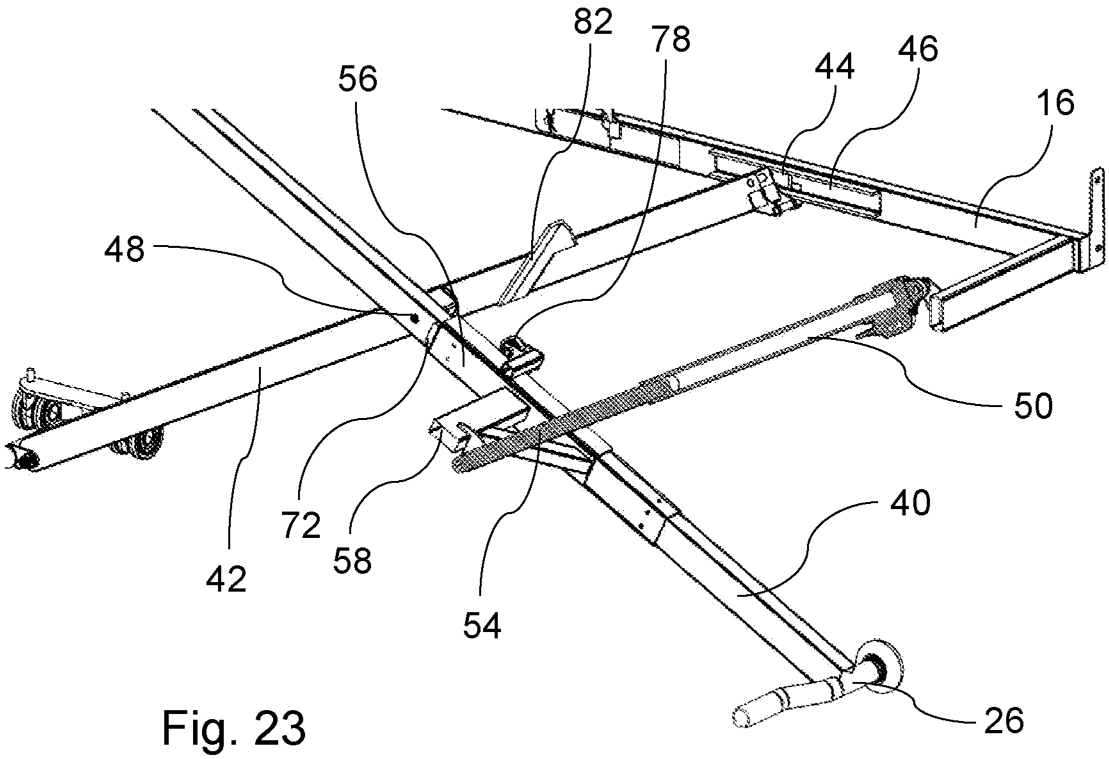
FIG. 23 is a partial sectional view along the line XXIII-XXIII of FIG. 20.

In this embodiment a slide member 44 is attached to the second end of each of the second legs 42 (as shown most clearly in FIGS. 19 and 23). The slide member 44 is preferably rotatably attached to the second leg 42. The slide member 44 is engaged with a part of the support frame 12 so as to permit movement of the second end of the second leg 42 in a direction parallel or substantially parallel to the side members 16 of the support frame 12. The slide member 44 is preferably engaged in a channel or elongate groove or slot 46. The slide member 44 may be in the form of a block, as illustrated, or in the form of a wheel or roller. The slide member 44 is retained in the channel, groove or slot 46 throughout the full movement of the support frame 12 from the fully lowered position to the fully raised position. During this range of movement the slide member 44 may move from a first end of the channel or slot 46 to a second end of the channel or slot 46.

It will be appreciated that in some embodiments the second leg 42 may be pivotally or rotatably connected to the slide member 44 and movement between the slide member 44 and the support frame 12 may be purely translational. In other embodiments the slide member 44 may be configured for both rotational and translational movement with respect to the support frame 12.

In this embodiment a length of U-shaped channel 46 extends along the length of each of the side members 16 and each piece of U-shaped channel 46 is attached to an inner face of the respective side member 16. The channel 46 is configured to retain the slide member 44 so that during movement of the support frame 12 between lowered and raised positions translational movement of the slide member 44 is only along the length of the channel 46.

Figure 4:
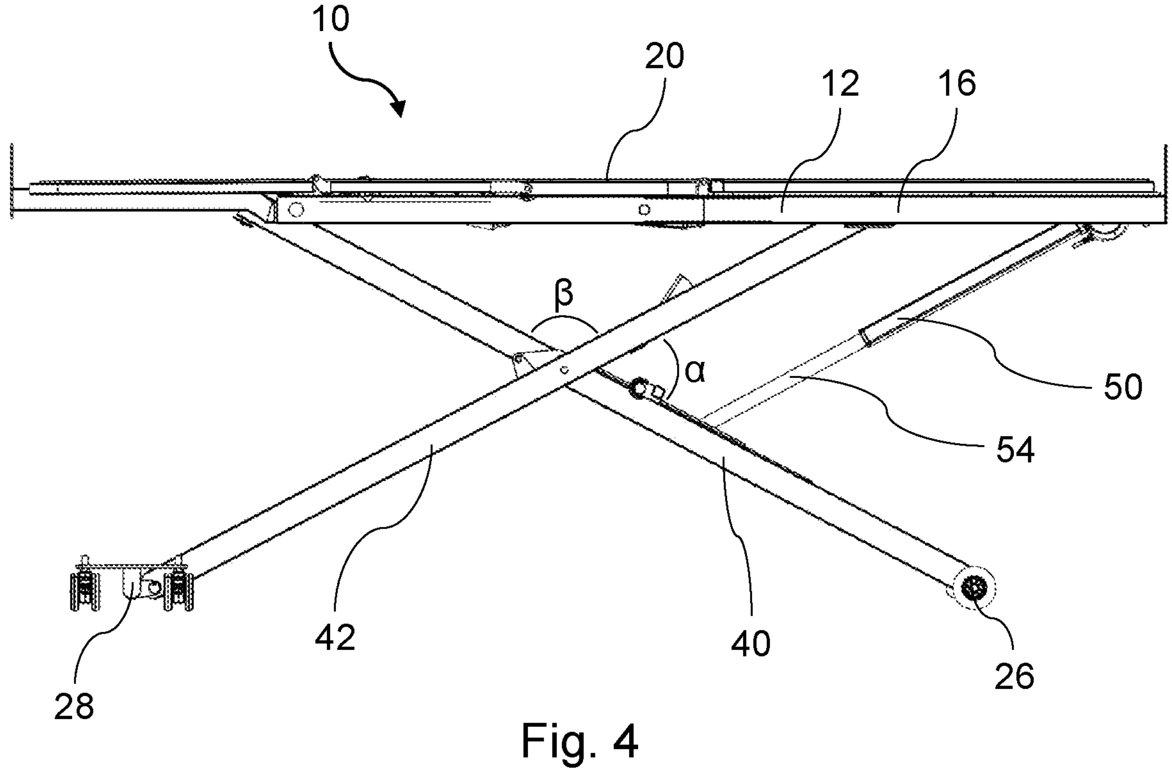
FIG. 4 is a side view of the bed of FIG. 1 including the lifting mechanism according to the present invention in a fully raised configuration.
Figure 5:
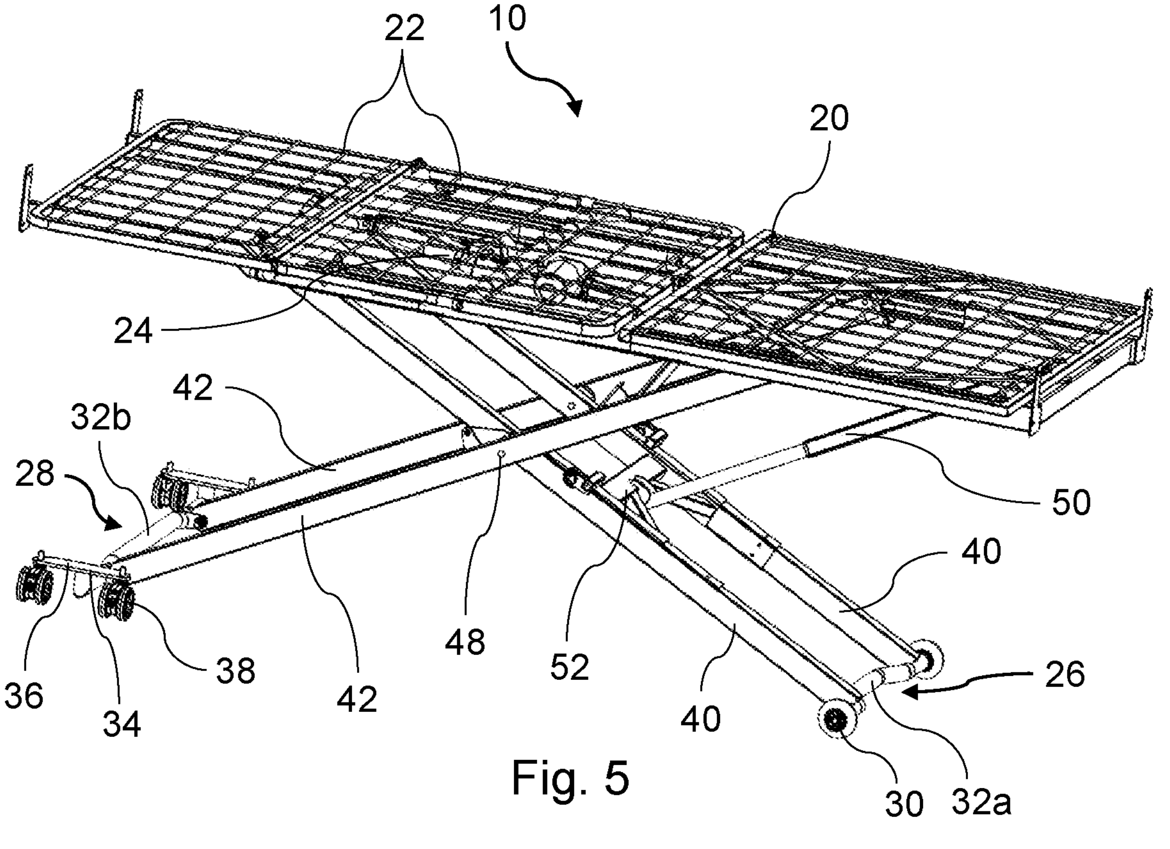
FIG. 5 is a perspective view of the bed of FIG. 4 in the fully raised position.
Figure 6:
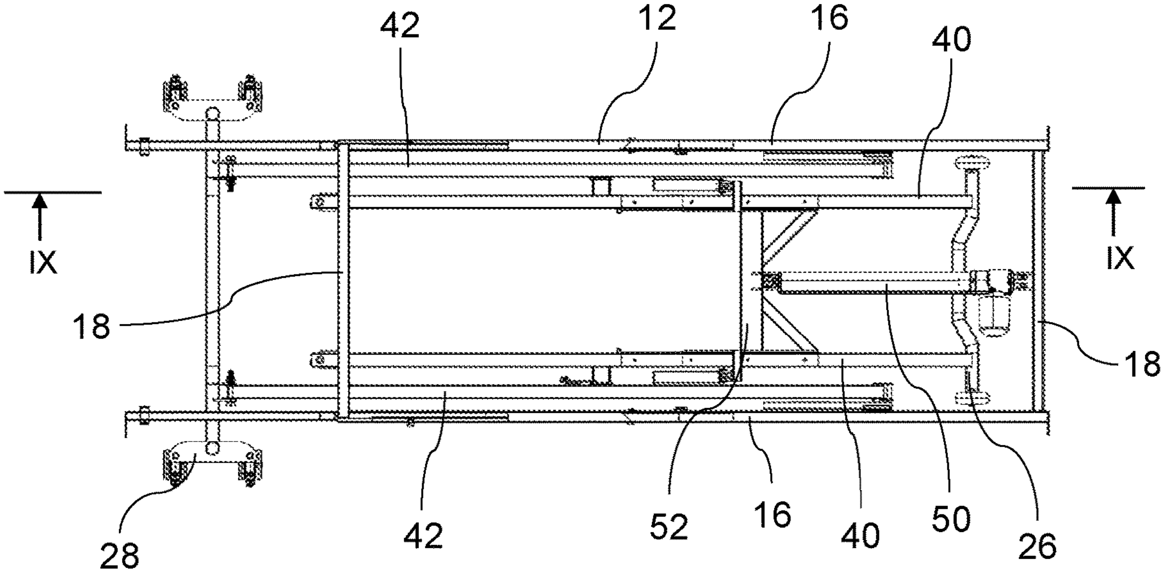
FIG. 6 is a plan view from above of the bed of FIG. 1 in the fully lowered position, and with a mattress frame of the bed removed.
Figure 7:
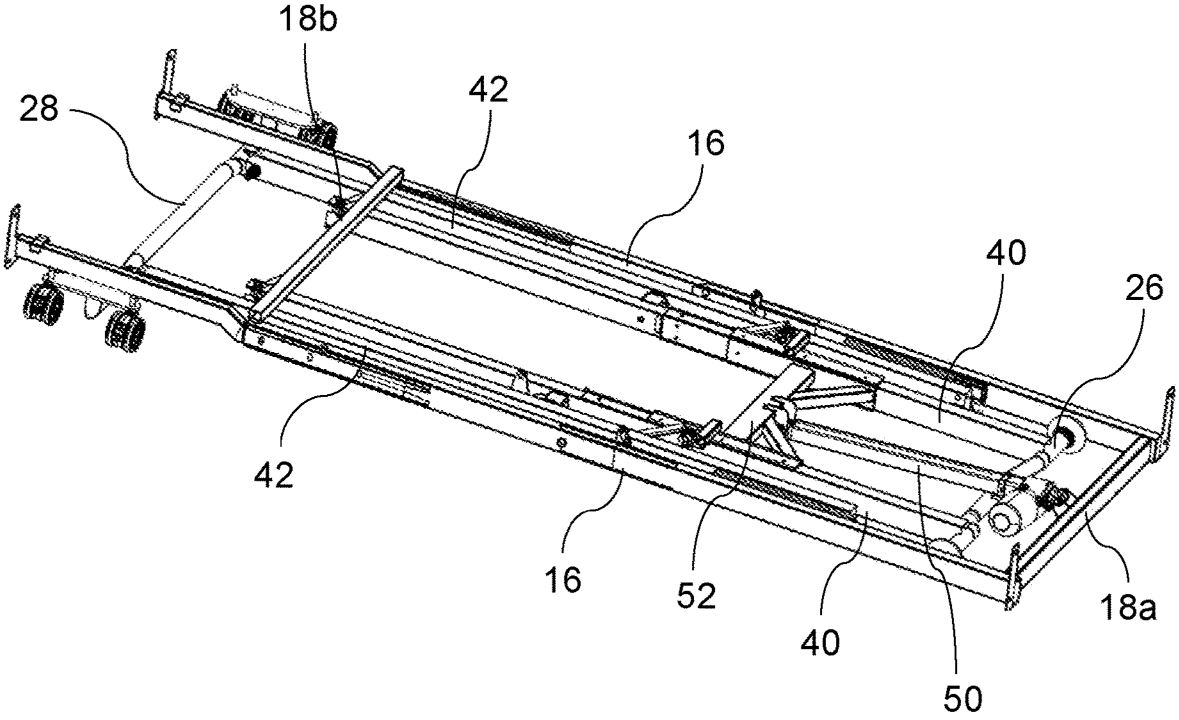
FIG. 7 is a perspective view of the bed of FIG. 6.

During movement of the support frame 12 from the fully lowered position to the fully raised position a vertical angle $\alpha$, shown in FIG. 4, between the lower portion of the first legs 40 and the upper portion of the second legs 42 and between the lower portion of the second legs 42 and the upper portion of the first legs 40 increases. Similarly, a vertical angle $\beta$ between the upper portions of the first and second legs 40, 42 and between the lower portions of the first and second legs 40, 42 decreases during this movement. In the fully lowered position the angles $\alpha$ are preferably less than 5° and more preferably less than 3°, such that the legs 40, 42 extend substantially parallel to each other. In the fully raised position the angle $\alpha$ may be between 40° and 60°, or more preferably between 45° and 55°.

To facilitate movement of the first and second legs 40, 42 to lower and/or raise the support frame 12, an actuator 50 applies a force to the pair of first legs 40. The actuator 50 is connected to the first legs 40 via a moveable carriage assembly 52.

In this embodiment the actuator 50 is a linear actuator and is, in particular, in the form of a piston comprising a piston rod 54. A first end of the actuator 50 is pivotally connected to the support frame 12. In this embodiment the first end of the actuator 50 is connected to the first transverse member 18*a* extending between the first ends 14*a* of the side members 16. A second end of the actuator 50, provided at a distal end of the piston rod 54, is pivotally connected to the carriage assembly 52.

The carriage assembly 52 comprises a pair of bearing members 56 joined by a cross member 58. Each of the bearing members 56 is designed to be engaged with a respective one of the first legs 40 so as to permit sliding movement of the bearing members 56 along the first legs 40. In particular, each of the bearing members 56 is configured to slide along each of the first legs 40 in a direction parallel to or substantially parallel to a longitudinal axis of the first leg 40. In this embodiment each of the bearing members 56 has an L-shaped cross-sectional shape, and includes an upper plate 60 and a side plate 62 extending perpendicularly from the upper plate 60 (as shown most clearly in FIGS. 15 and 18). Each bearing member 56 is engaged with the respective first leg 40 so that the upper plate 60 extends over an upper surface 64 of the first leg 40 and the side plate 62 extends over an inner side surface 66 of the first leg 40. In this embodiment each of the bearing members 56 is elongate and extends between first and second ends 68, 70.

The cross member 58 extends between the two bearing members 56. A length of the cross member 58 is such that the bearing members 56 are spaced apart so that the side plate 62 of a first one of the bearing members 56 is in contact with the inner side surface 66 of a first one of the first legs 40 and the side plate 62 of a second one of the bearing members 56 is in contact with the inner side surface 66 of a second one of the first legs 40. In this example the cross member 58 is attached at a first end to the side plate 62 of the first bearing member 56 and at a second end to the side plate 62 of the second bearing member 56.

The second end of the actuator 50 is preferably pivotally attached to the cross member 58. More preferably the second end of the actuator 50 is attached to the cross member 58 approximately midway along the length of the cross member 58 to ensure an even distribution of forces between the two bearing members 56.

Each of the first legs 40 includes a stop element 72. The stop element 72 is in the form of a protrusion 74 that extends from a surface of the first leg 40. In this embodiment the protrusion 74 extends from the inner surface of the first leg 40. The stop element 72 is positioned such that, during movement of the carriage assembly 52, the bearing members 56 move between a first end limit position, where the support frame 12 is fully lowered, and a second end limit position in which the first end 68 of each of the bearing members 56 abuts a respective one of the stop elements 72. In this way, each of the stop elements 72 provides an abutment surface 76. Each bearing member 56 comes into contact with the respective abutment surface 76 at the second end limit position of the bearing member 56.

The carriage assembly 52 further includes a pair of sliders 78. Each slider 78 is attached to a respective one of the bearing members 56. In this embodiment the sliders 78 are in the form of wheels or rollers. In this particular arrangement of the carriage assembly 52, each slider 78 is mounted on a bracket 80 that extends from the upper plate 60 of the bearing member 56.

A guide rail or runner 82 is attached to each of the second legs 42. Each runner 82 comprises an elongate member extending between first and second ends 84, 86. A longitudinal axis of the runner 82 is defined by and extends between the first and second ends 84, 86 of the elongate member. The first end 84 of the runner 82 is disposed nearer the second end of the second leg 42 and the second end 86 of the runner 82 is disposed nearer the first end of the second leg 42. In this embodiment the elongate member has an L-shaped cross sectional shape and comprises an attachment plate 88 and a track plate 90 that extends perpendicularly from the attachment plate 88. The track plate 90 provides a contact surface 92 of the runner 82.

Figure 8:
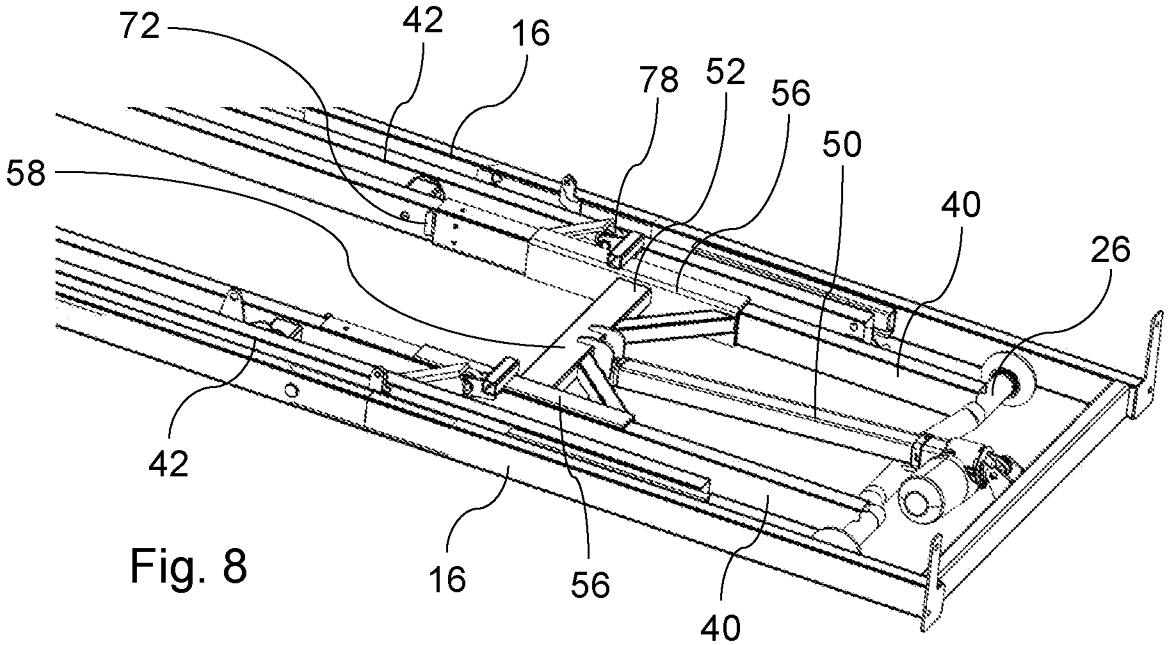
FIG. 8 is a perspective view of a part of the bed of FIG. 7, showing a part of the lifting mechanism of the bed including an actuator and a carriage assembly.
Figure 9:
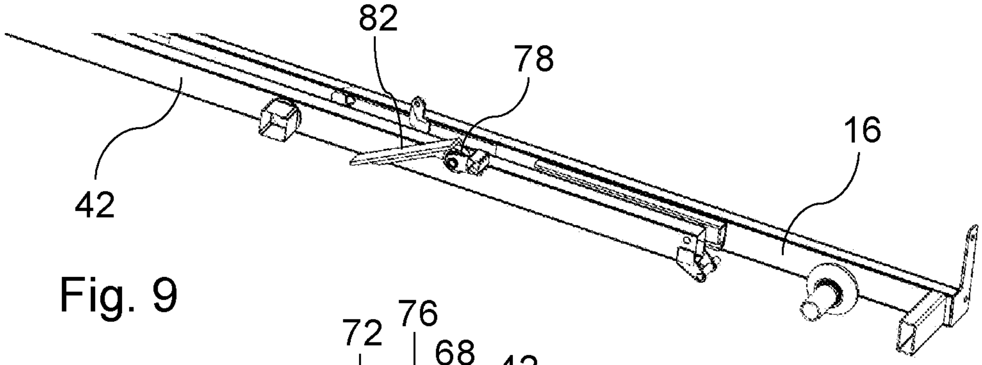
FIG. 9 is a partial sectional view along the lines IX-IX of FIG. 6.
Figure 10:
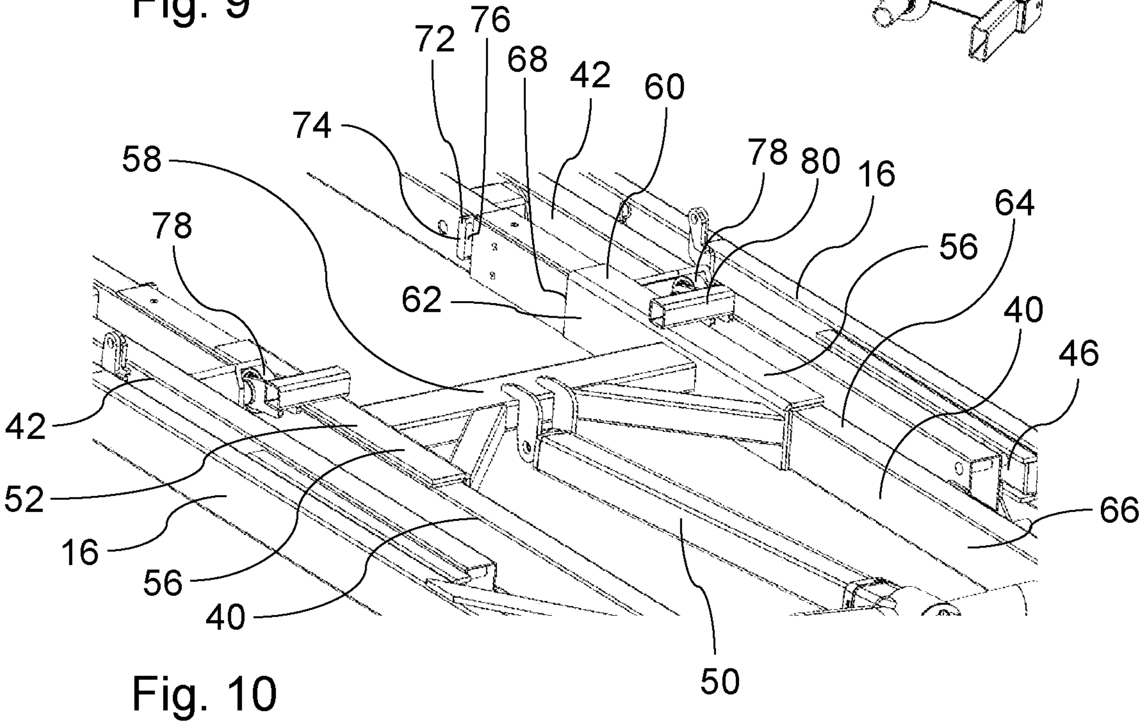
FIG. 10 is a further perspective view of a part of the lifting mechanism of FIG. 8.
Figure 11:
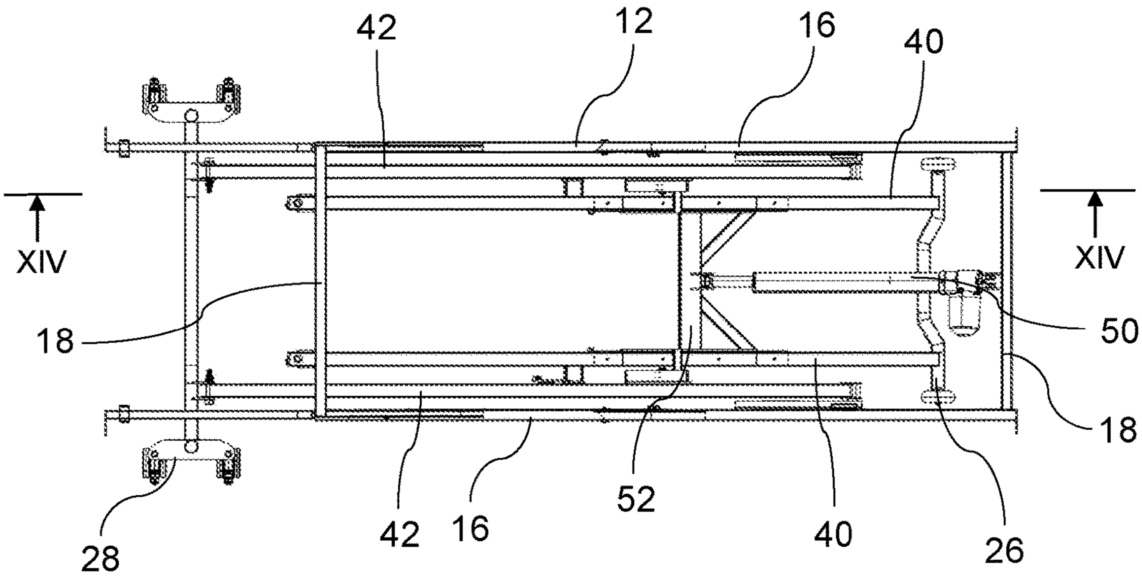
FIG. 11 is a plan view from above of the bed of FIG. 2 in the first partially raised position, and with the mattress frame of the bed removed.
Figure 12:
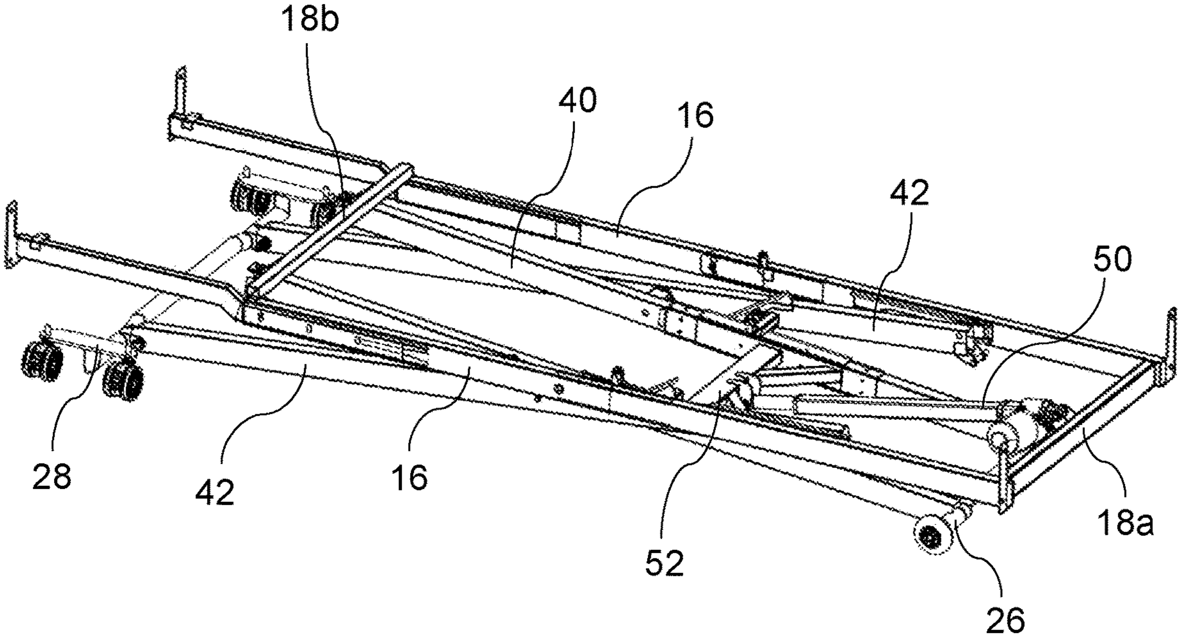
FIG. 12 is a perspective view of the bed of FIG. 11.
Figure 13:
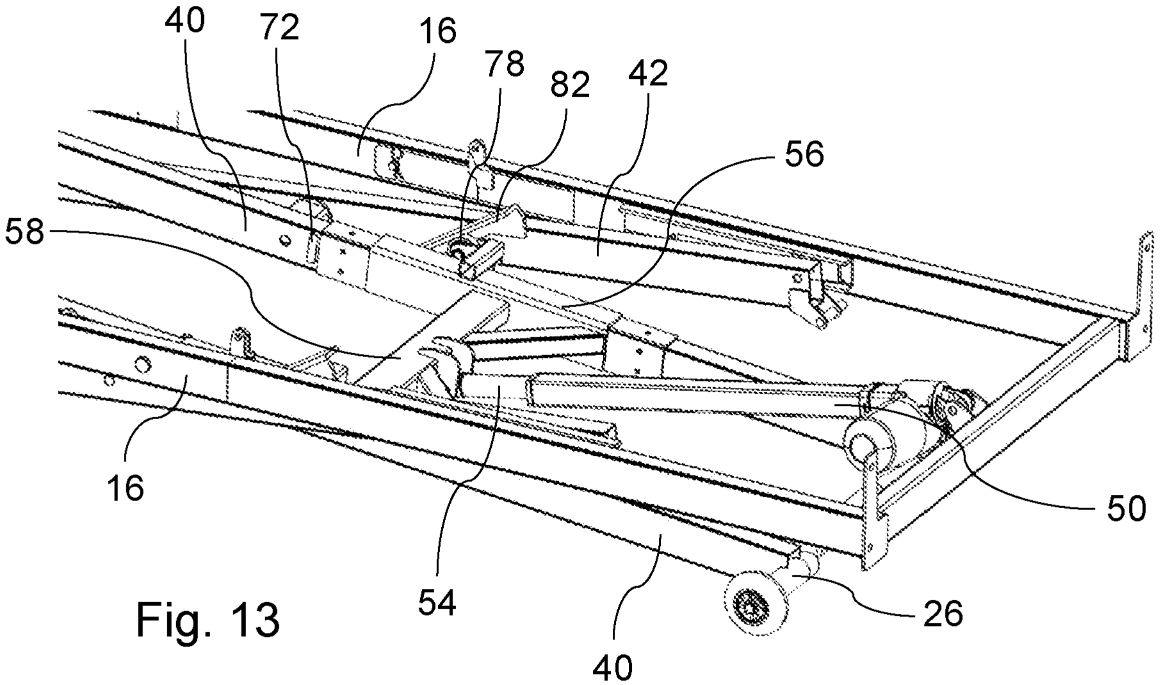
FIG. 13 is a perspective view of a part of the bed of FIG. 12, showing a part of the lifting mechanism of the bed including the actuator and the carriage assembly.
Figure 14:
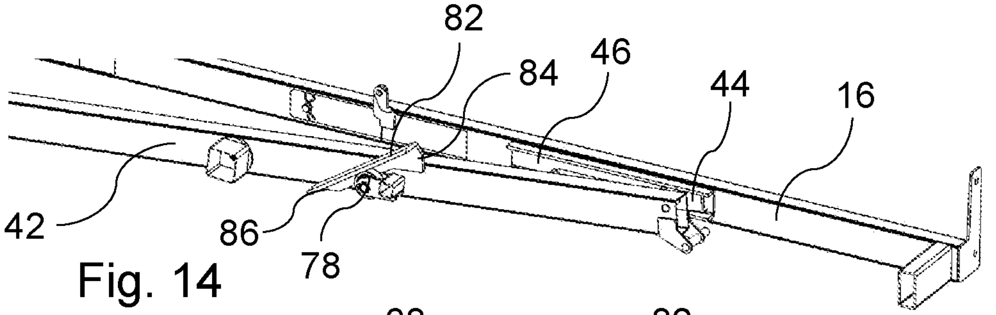
FIG. 14 is a partial sectional view along the lines XIV-XIV of FIG. 11.
Figure 15:
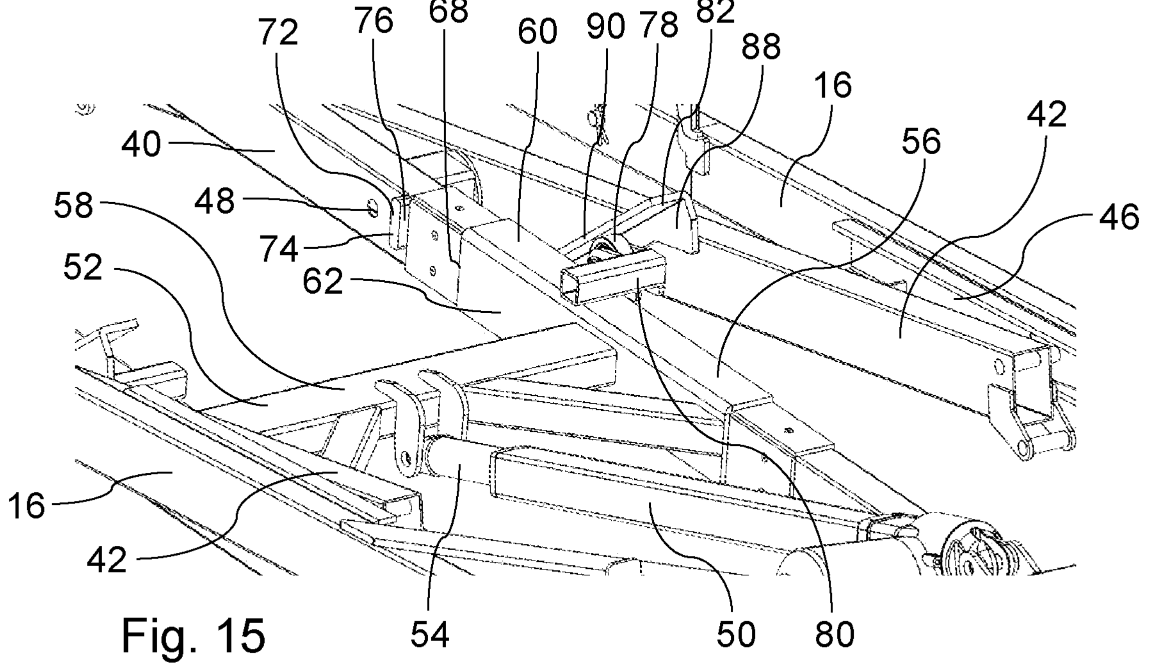
FIG. 15 is a further perspective view of a part of the lifting mechanism of FIG. 13.
Figure 16:
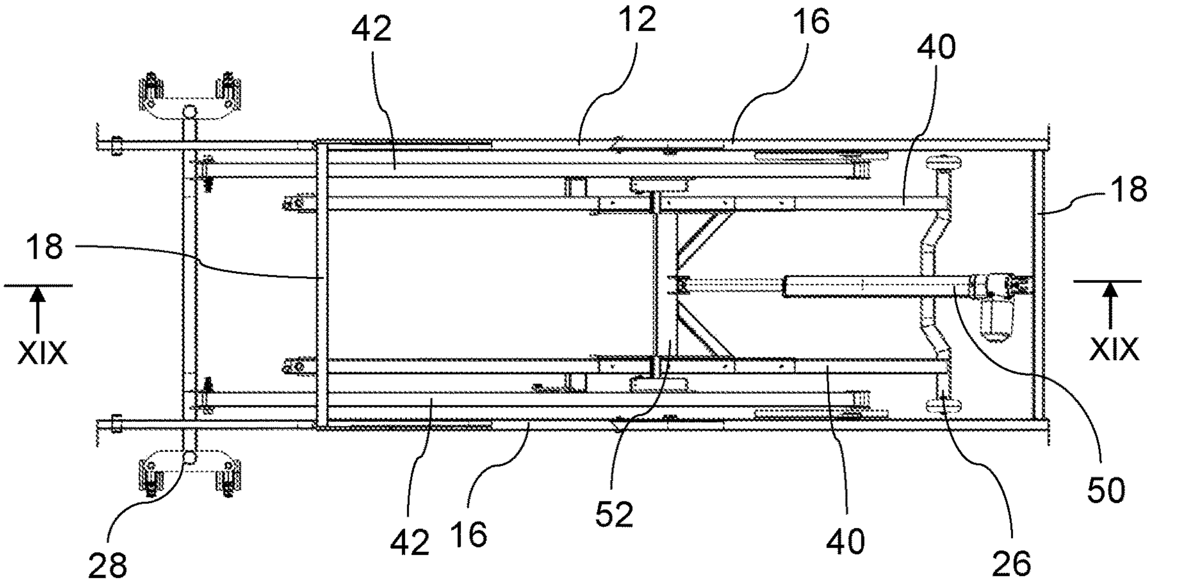
FIG. 16 is a plan view from above of the bed of FIG. 3 in the second partially raised position, and with the mattress frame of the bed removed.
Figure 17:
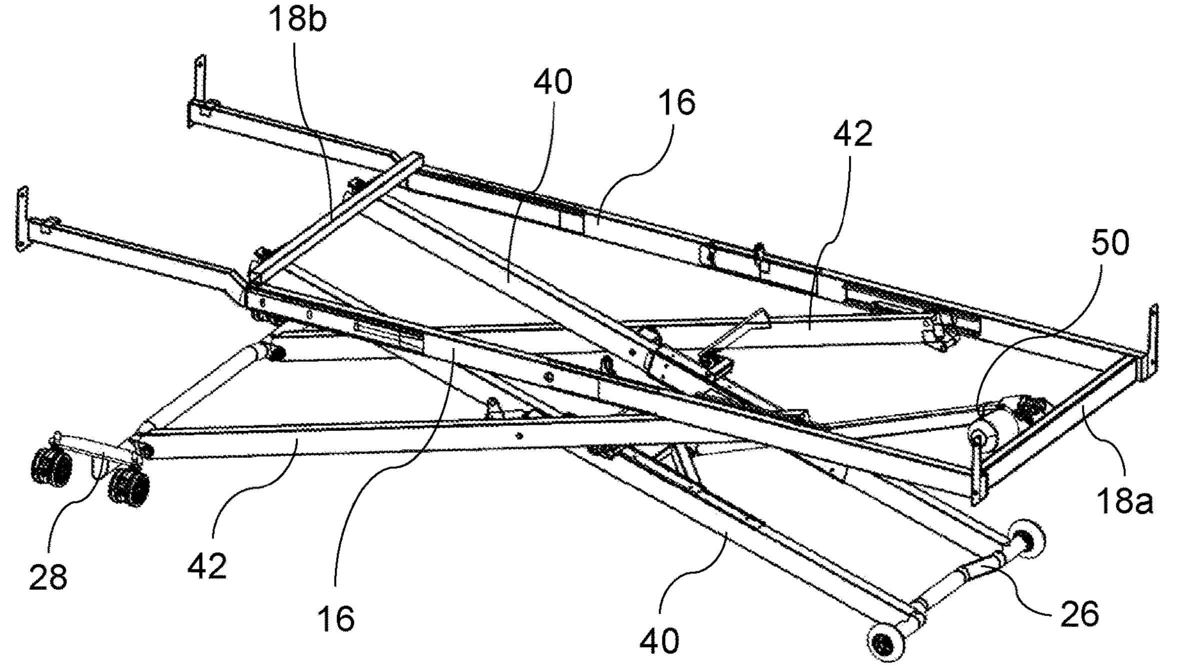
FIG. 17 is a perspective view of the bed of FIG. 16.
Figure 18:
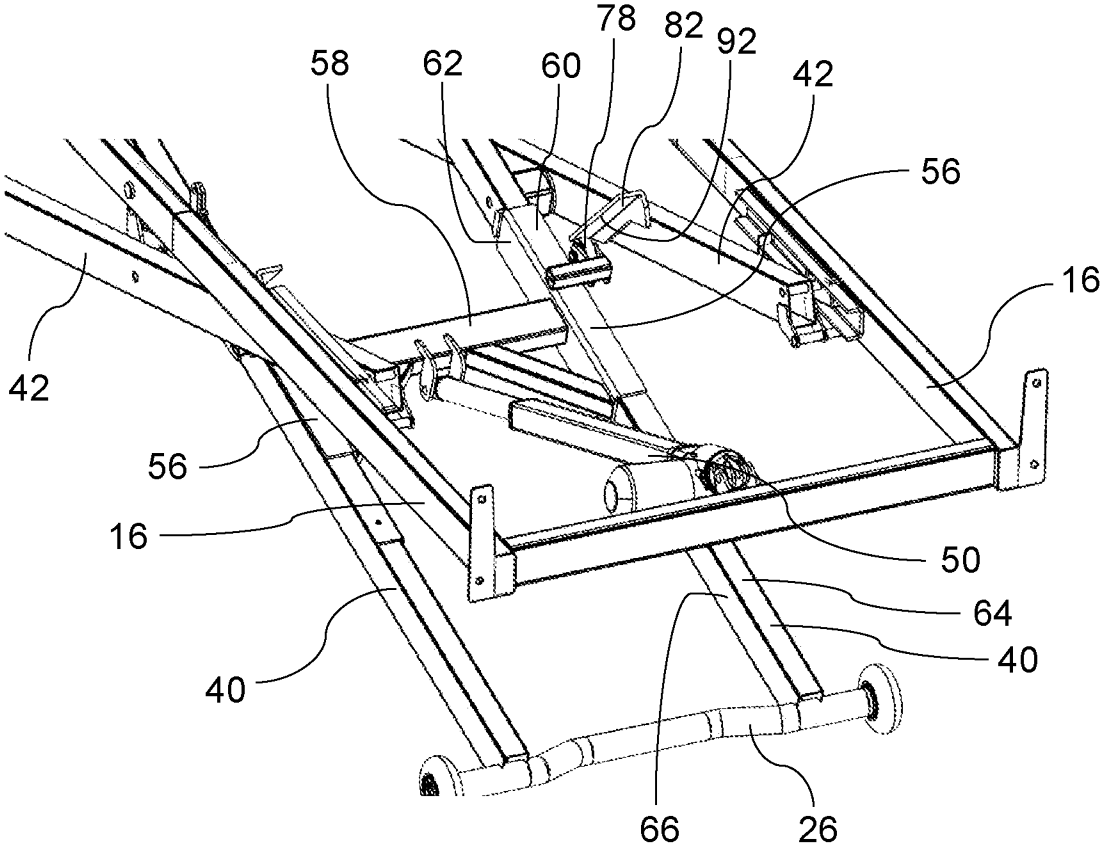
FIG. 18 is a perspective view of a part of the bed of FIG. 17, showing a part of the lifting mechanism of the bed including the actuator and the carriage assembly.

Each runner 82 is disposed on the respective second leg 42 such that there is a non-zero angle between the longitudinal axis of the runner 82 and a longitudinal axis of the second leg 42. In this way the track plate 90, and therefore the contact surface 92, extends transversely across the second leg 42. In particular, the first end 84 of the runner 82 is disposed above an upper surface of the second leg 42. The second end 86 of the runner 82 is preferably adjacent to or contiguous with a lower surface of the second leg 42. Referring in particular to FIG. 8, when the support frame 12 is in the fully lowered position, such that the second legs 42 are substantially horizontal, the first end 84 of the runner 82 projects above the second leg 84 in a direction away from the floor on which the bed 10 is standing.

An angle between a plane of the contact surface 92 and the longitudinal axis of the second leg 42 is preferably between 20° and 45°, and more preferably between 25° and 35°. In this example the angle between the plane of the contact surface 92 and the longitudinal axis of the second leg 42 is about 28°.

Each runner 82 is positioned such that during a part of the range of movement of the first and second legs 40, 42, each of the sliders 78 is engaged with a respective one of the runners 82. In particular, each of the sliders 78 is in contact with the contact surface 92 of the respective runner 82. With the support surface 12 in the fully lowered position each slider 78 is preferably in contact with the contact surface 92 at the first end 84 of the runner 82.

Raising of the support frame 12 will now be described with particular reference to FIGS. 6 to 23.

Starting in a fully lowered position, shown in FIGS. 6 to 10 and as described above, the first and second legs 40, 42 are in a substantially horizontal configuration such that both the pair of first legs 40 and the pair of second legs 42 generally lie in a plane that is substantially parallel to a plane of the support frame 12. Furthermore, it will be appreciated that, in this position, an angle between an axis of the linear actuator and the longitudinal axes of the first and second legs 40, 42 is small; generally less than about 10°. Accordingly, when the piston rod 54 of the actuator 50 is extended the majority of the force applied to the carriage assembly 52 is in a direction parallel to the longitudinal axes of the legs 40, 42. However, in this fully lowered position the sliders 78 are in contact with a first end region of each of the contact surfaces 92 of the runners 82 proximate or at the first end 84 of the runner 82. Due to the angle of the runners 82 relative to the longitudinal axes of the first legs 40, each slider 78 applies a force to a respective runner 82 which has a first component that acts in a direction parallel to the axis of the runner 82 and a second component that acts in a direction perpendicular to the axis of the runner 82 and perpendicular to the plane of the contact surface 92.

The actuator 50 is connected at its second end to the lower regions of the first legs 40 on the same side of the leg pivot 48 as both the connection of the first end of the actuator to the support frame 12 and the connection of the second ends of the second legs 42. As such, an increase in the length of the actuator 50 causes a force to be applied to the runners 82 by the sliders 78 such that the lower portion of the first legs 40 moves in a direction away from the upper portion of the second legs 42 and the angle α increases.

Referring now additionally to FIGS. 11 to 15, during a first part of the movement of the actuator 50, each of the bearing members 56 moves from the first end limit position in a direction along the pair of first legs 40 towards the stop elements 72. Furthermore, each of the sliders 78 moves along the respective runner 82 in a direction towards the second end 86 of the runner 82.

Relative movement of each slider 78 along the respective runner 82 and each bearing member 56 along the respective first leg 40 continues until the first end 68 of each of the bearing members 56 abuts the respective stop element 72. As shown in FIGS. 16 to 19, in this position each of the sliders 78 is disposed at a second end region of each of the contact surfaces 92, proximate or at the second end 86 of each of the runners 82.

As the length of the actuator 50 continues to increase, the bearing members 56 remain in contact with the stop elements 72, and further movement of the bearing members 56 along the first legs 40 is prevented. Additionally, the sliders 78 are no longer in contact with the runners 82. As such, the force applied by the actuator 50 to the carriage assembly 52 is transferred directly to the pair of first legs 40 to continue to increase the angle α.

In this embodiment movement of the first legs 40 relative to the second legs 42 continues until the actuator 50 is fully extended. In this position the bed 10 is fully raised, as shown in FIGS. 20 to 23. In other embodiments an upper limit feature may be included to prevent or limit further relative movement of the first and second legs 40, 42 once the bed 10 has reached a fully raised position, even if the actuator 50 is not fully extended. The upper limit feature may, for example, limit or prevent further translational movement of the slide members 44 along the channel or slot 46 of the support frame 12 in a direction towards the second end of the channel 46.

It will be understood that the above described mechanism may also be used to lower the bed from the fully raised position to the fully lowered position.

Starting from the fully raised position, as the length of the actuator 50 initially starts to decrease, the angle between an axis of the actuator 50 and the first legs 40, and the angle α, are such that the first ends 68 of the bearing members 56 remain in contact with the stop elements 72. During this movement a force due to the weight of the support frame 12 and any additional load supported on the support frame 12 is transferred to the carriage assembly 52 and the actuator 50 by the stop elements 72 being in contact with the bearing members 56.

When the angle α has decreased sufficiently, the sliders 78 contact the second ends 86 of the runners 82. A continued decrease in the length of the actuator 50 causes the sliders 78 to move along the contact surfaces 92 of the runners 82 towards the first ends 84 of the runners 82. Additionally, the bearing members 56 move along the first legs 40 in a direction away from the stop elements 72 such that the first ends 68 of the bearing members 56 are no longer in contact with the abutment surfaces 76 of the stop elements 72. During this movement a force due to the weight of the support frame 12 and any additional load supported on the support frame 12 is transferred to the carriage assembly 52 and the actuator 50 by the runners 82 being in contact with the sliders 78.

In this embodiment movement of the first legs 40 relative to the second legs 42 continues until the actuator 50 is fully retracted. In this position the bed 10 is fully lowered. In other embodiments a lower limit feature may be included to prevent or limit further relative movement of the first and second legs 40, 42 once the bed 10 has reached a fully lowered position, even if the actuator 50 is not fully retracted. The lower limit feature may, for example, limit or prevent further translational movement of the slide members 44 along the channel or slot 46 of the support frame 12 in a direction towards the first end of the channel 46. In other embodiments the lower limit feature may, for example, include a projection connected to one or each of the first legs 40 that contacts a part of one or each of the second legs 42 to prevent or limit further relative movement of the first and second legs 40, 42.

It will be further understood that the bed 10 may be moved to a partially raised or partially lowered position and maintained in that position by ceasing movement of the actuator 50.

While in the embodiment above the support frame 12 was described as having a first end **14*a* to which a headboard may be attached and a second end 14*b*** to which a footboard may be attached, it will be appreciated that in other embodiments the arrangement of the support frame may be reversed such that a footboard may be attached to the first end of the bed and a headboard may be attached to the second end of the bed.

Although in the above embodiment the actuator is a linear actuator, in other embodiments the actuator may be of any suitable type and configuration. Preferably, the actuator is accommodated below the support frame when the support frame is in the lowered position.

The lifting mechanism may comprise more than one actuator. For example, two actuators that are actuated simultaneously may be connected to the carriage assembly to permit smaller or less powerful actuators to be used.

The wheels or casters of the feet of the bed may include a brake mechanism that may be operated to prevent rotation of the wheels. In other embodiments the feet may not include wheels. In embodiments in which the feet include wheels or casters, each foot may include only one wheel or may include more than two wheels.

In the above embodiment the legs were described as being in the form of box sections having upper and lower surfaces, and inner and outer surfaces. In other embodiments the legs may have any cross-sectional shape. For example, the legs may be tubular, having an annular or circular cross-sectional shape.

Although in the above embodiment the bed comprised a pair of first legs and a pair of second legs, in other embodiments the bed may comprise a single first leg and a single second leg. The first leg preferably connects the first foot assembly to the support frame and the second leg preferably connects the second foot assembly to the support frame. In these embodiments the first leg may be connected, at its first end, to the elongate shaft of the first foot assembly approximately midway along the length of the elongate shaft.

Similarly, the second leg may be connected, at its first end, to the elongate shaft of the second foot assembly approximately midway along the length of the elongate shaft.

The present invention provides an improved bed lifting mechanism that allows a bed to be lowered close to the floor to reduce injuries from falls and to be raised to a suitable height whilst permitting removal of the headboard and/or footboard of the bed (when present) to enable easy access to a person lying on the bed.

The invention claimed is:

1. A lifting mechanism for a bed comprising:

an elongate first leg having a first leg axis;

an elongate second leg having a second leg axis and being pivotally connected to the first leg;

a carriage assembly slidably connected to the first leg so as to be moveable in a direction substantially parallel to the first leg axis;

a guide rail connected to the second leg and having a guide rail axis, the guide rail axis being at a non-zero angle to the second leg axis; and a moveable actuator configured to apply a force to the carriage assembly, wherein, during a first range of movement of the actuator the carriage assembly moves relative to the first leg and the carriage assembly is engaged with the guide rail to apply a force to the guide rail, and during a second range of movement of the actuator the carriage assembly is disengaged from the guide rail and engages with the first leg, and wherein movement of the actuator causes movement of the first leg relative to the second leg about the pivotal connection.

2. The lifting mechanism according to claim 1, wherein the first leg includes a stop element, and wherein engagement of the carriage assembly with the first leg comprises contact between the carriage assembly and the stop element.

3. The lifting mechanism according to claim 2, wherein contact between the carriage assembly and the stop element limits movement of the carriage assembly relative to the first leg along the first leg axis.

4. The lifting mechanism according to claim 2, wherein the stop element comprises a protrusion and a part of the carriage assembly abuts the protrusion at the end of the first range of movement of the actuator and the carriage assembly remains in contact with the protrusion during the second range of movement of the actuator.

5. The lifting mechanism according to claim 1, wherein during the first range of movement of the actuator a part of the carriage assembly engaged with the guide rail moves from a first end of the guide rail to a second end of the guide rail.

6. The lifting mechanism according to claim 5, wherein the carriage assembly includes a bearing member slidingly engaged with the first leg and a slider protruding from the bearing member, the slider arranged to slidingly engage with the guide rail during the first range of movement of the actuator.

7. The lifting mechanism according to claim 1, wherein an angle between the guide rail axis and the second leg axis is between 20° and 45°.

8. The lifting mechanism according to claim 1, wherein the actuator is a linear actuator.

9. The lifting mechanism according to claim 8, wherein an end of the linear actuator is connected to the carriage assembly.

10. The lifting mechanism according to claim 1, wherein the pivotal connection between the first leg and second leg is midway along the length of each of the first leg and the second leg.

11. The lifting mechanism according to claim 1, comprising a pair of first legs and a pair of second legs, each of the first legs being pivotally connected to a respective one of the second legs.

12. The lifting mechanism according to claim 11, wherein the carriage assembly comprises a bearing member slidingly engaged with each of the first legs and a cross member extending between and connecting the bearing members.

13. The lifting mechanism according to claim 12, comprising a pair of guide rails, each guide rail being connected to a respective one of the second legs, and wherein a slider protrudes from each of the bearing members and each of the sliders is arranged to slidingly engage with a respective one of the guide rails during the first range of movement of the actuator.

14. The lifting mechanism according to claim 12, wherein the actuator is connected to the cross member.

15. The lifting mechanism according to claim 1, wherein the carriage assembly, guide rail and actuator are all on the same side as a plane passing through the pivotal connection between the first leg and the second leg, the plane being parallel to an axis of the pivotal connection.

16. A bed comprising:

a support frame for supporting a mattress; and a lifting mechanism comprising:

an elongate first leg having a first leg axis, an end of the first leg being pivotally connected to the support frame;

an elongate second leg having a second leg axis and being pivotally connected to the first leg, and an end of the second leg being pivotally connected to the support frame;

a carriage assembly slidably connected to the first leg so as to be moveable in a direction substantially parallel to the first leg axis;

a guide rail connected to the second leg and having a guide rail axis, the guide rail axis being at a non-zero angle to the second leg axis; and a moveable actuator configured to apply a force to the carriage assembly, wherein, during a first part of said movement of the actuator the carriage assembly moves relative to the first leg and the carriage assembly is engaged with the guide rail to apply a force to the guide rail, and during a second part of said movement of the actuator the carriage assembly is disengaged from the guide rail and engages with the first leg, and wherein said movement of the actuator causes movement of the first leg relative to the second leg about the pivotal connection so as to raise and lower the support frame.

17. The bed according to claim 16, wherein the end of the second leg is pivotally and slidingly connected to the support frame.

18. The bed according to claim 16, wherein the actuator comprises a linear actuator, a first end of the actuator being connected to the support frame and a second end of the actuator being connected to the carriage assembly.

19. The bed according to claim 16, wherein the carriage assembly, guide rail and actuator are all on the same side as a plane passing through the pivotal connection between the first leg and the second leg, the plane being parallel to an axis of the pivotal connection and perpendicular to a plane of the support frame.

20. The bed according to claim 16, further comprising a mattress frame supported by the support frame, the mattress frame comprising an angle adjustable section.

* * * * *